United States Patent Office 3,391,949
Patented July 9, 1968

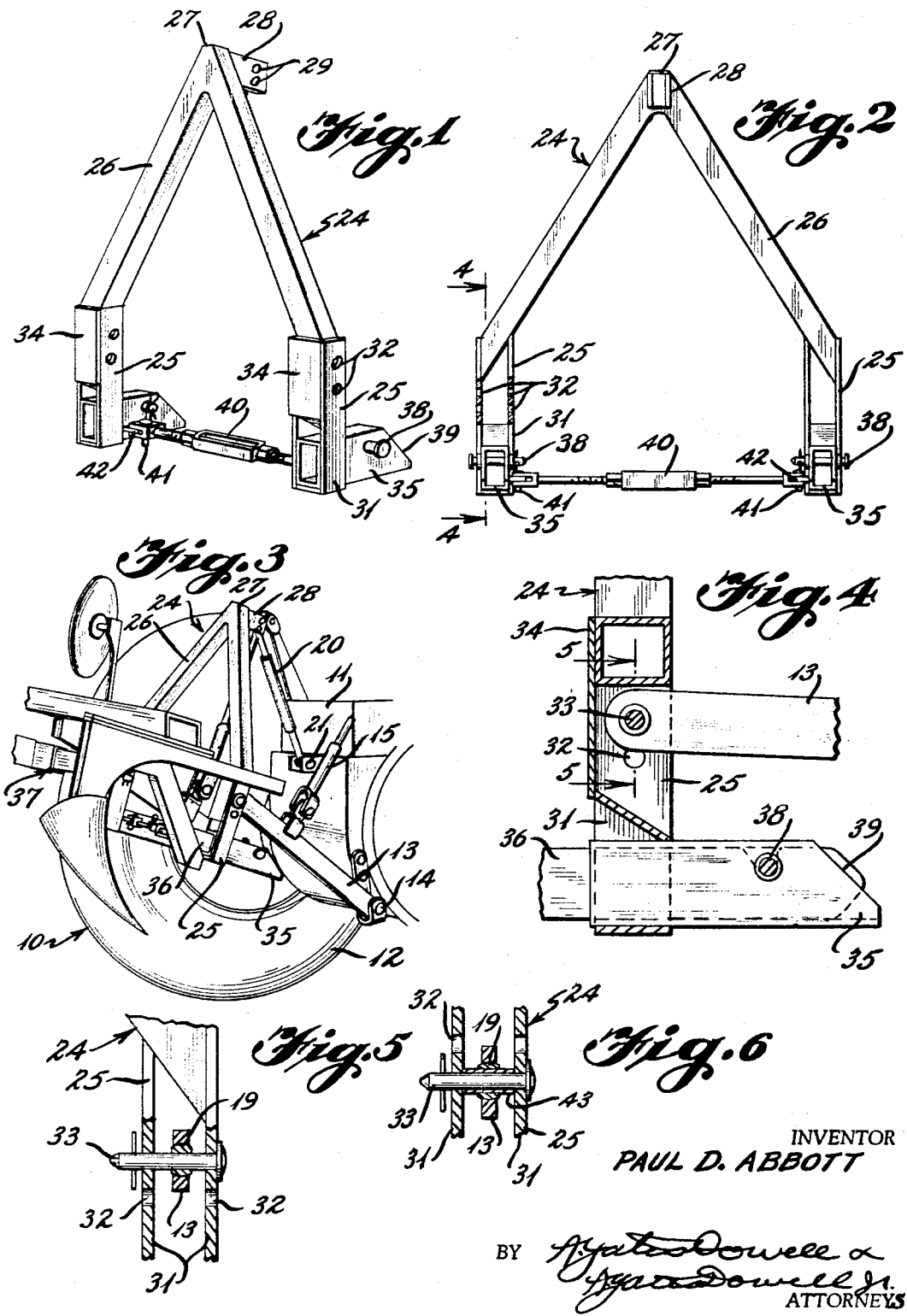

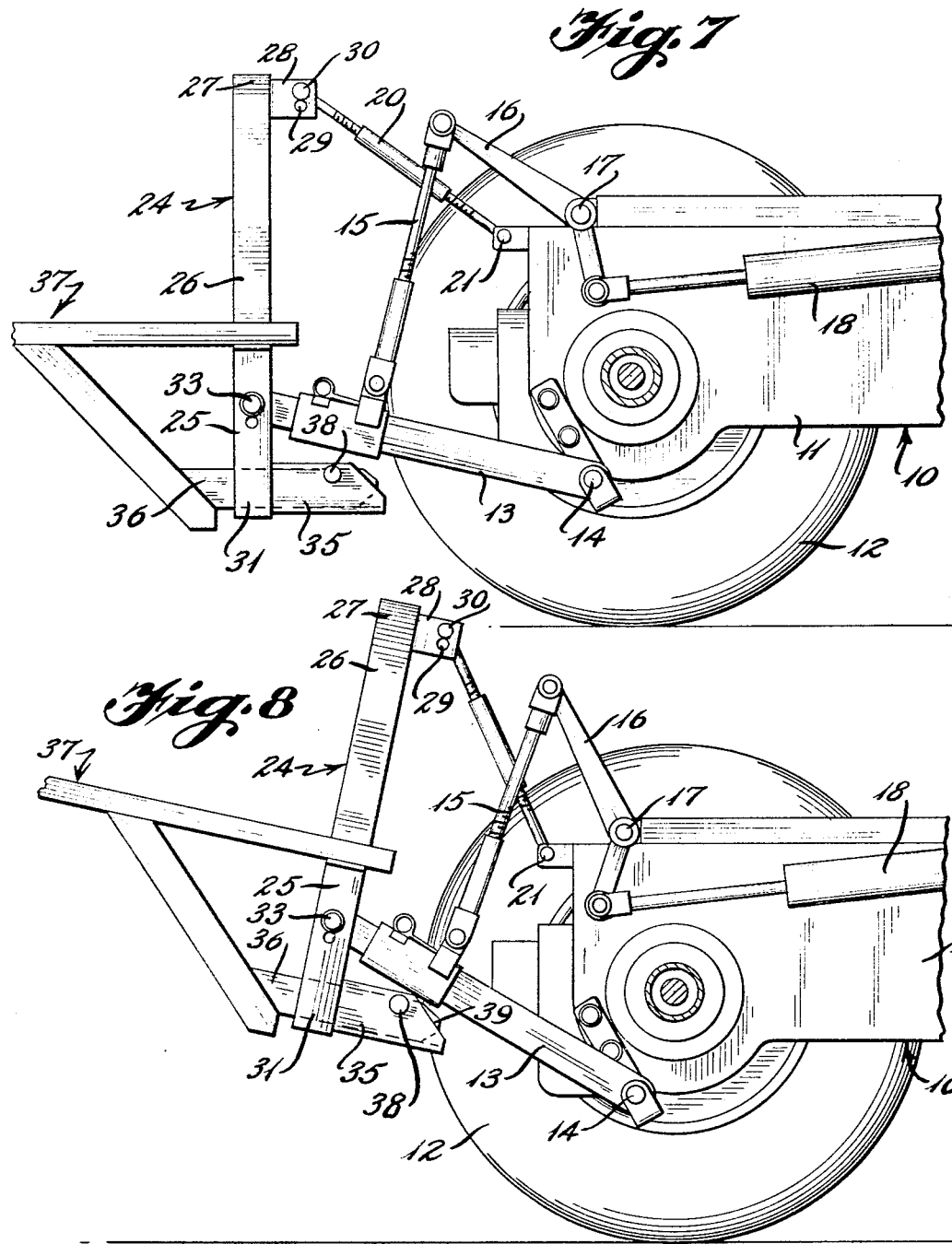

3,391,949
TRACTOR HITCH CONVERTER
Paul D. Abbott, P.O. Box 187, Blytheville, Ark. 72315
Filed Mar. 23, 1966, Ser. No. 536,904
1 Claim. (Cl. 280—415)

ABSTRACT OF THE DISCLOSURE

Apparatus for connecting an earth working implement having a two-point hitch connection to the three-point hitch of a propelling vehicle.

This application relates to farm equipment and to apparatus for connecting an implement having a two-point connection to a propelling vehicle having a three-point hitch connection.

Heretofore, most implement manufacturers have made implements with either a two-point connection for a vehicle having a two-point hitch or a three-point connection for a vehicle having a three-point hitch. Some efforts have been made to convert an implement for use with a vehicle having a different hitch connection, such as Patent No. 3,031,208 for a Universal Tractor Hitch; however, these prior devices have been expensive, complex, difficult to maintain, and for other reasons have not been satisfactory.

It is an object of the invention to provide a simple inexpensive device for attaching an implement to a propelling vehicle when the implement and vehicle attaching means are not compatible.

Another object of the invention is to provide a simple economical apparatus to convert a vehicle three-point hitch for use with a two-point or fast hitch of an implement in a minimum of time and with minimum effort.

Other objects and advantages of the invention will be apparent from the following description taken in conjunction with the accompanying drawings in which:

FIG. 1 is a front perspective illustrating one embodiment of the invention;

FIG. 2, a rear elevation thereof;

FIG. 3, a perspective illustrating the device in use;

FIG. 4, an enlarged fragmentary section on the line 4—4 of FIG. 2;

FIG. 5, a section on the line 5—5 of FIG. 4 and illustrating a connection for use with the draft arms of a Category I hitch;

FIG. 6, a section similar to FIG. 5 illustrating a connection for use with the draft arms of a Category II hitch;

FIG. 7, a side elevation illustrating the device in lowered position; and

FIG. 8, a side elevation illustrating the device in raised position.

With continued reference to the drawings a tractor or other propelling vehicle 10 is provided having a body 11 supported by ground-engaging wheels 12. The tractor 10 has a conventional three-point hitch including a pair of draft arms 13 located generally parallel to each other at a lower level, and such draft arms are pivotally mounted at one end on the body 11 of the tractor by pivot pins 14. Each of the draft arms 13 is pivotally connected intermediate its ends to one end of an adjustable link 15, the opposite end of which is connected to lift arms 16 which in turn may be mounted on a pivot 17 fixed to the body of the tractor and controlled by a fluid cylinder 18.

In certain tractors the lift arms 16 are mounted on a splined shaft controlled by a transmission within the body 11 and having an operating lever located in a position accessible to the operator of the vehicle to raise and lower the lift arms and the draft arms. The outer ends of the draft arms 13 preferably are provided with ball type sockets 19 which receive the connecting pins of an implement and from two points of a three-point hitch. An adjustable link 20 is pivotally mounted at one end on a pin 21 carried by the body 11 and the opposite end of adjustable link has an eye or ball type socket which forms the third point of a three-point hitch. The link 20 is somewhat shorter than the draft arms 13 for a purpose which will be described later. All of the structure decribed thus far is conventional and forms no part of the present invention.

Normally a three-point hitch can accommodate only an implement having a three-point connection and implements having a two-point connection cannot be connected thereto. In order to connect an implement having a two-point connection to a vehicle having a three-point hitch, the present invention includes an inverted generally V-shaped body 24 having a pair of generally parallel lower portions 25 welded or otherwise connected to an inwardly and upwardly converging portion 26 connected together at an apex indicated at 27. The converging portion 26 may be of any desired cross-section, such as square, cylindrical, angular or the like, which would impart the necessary strength to the structure. A pair of outwardly extending lugs 28 are welded or otherwise attached to the apex 27 and such lugs may be provided with one or more openings 29 for the reception of a connecting pin 30 by which the adjustable link 20 can be connected to the body 24.

Each of the lower portions 25 includes a pair of spaced parallel plates or members 31 having one or more openings 32 for the reception of connecting pins 33. Such connecting pins 33 pass through the members 31 of each pair and are received within the ball type socket 19 on the outer ends of the draft arms 13 to pivotally connect the draft arms to the body 24. If desired each pair of members may be connected by a plate 34 to impart additional strength and rigidity to the lower portions 25. It is noted that a structural steel channel could serve the same purpose as the members 31 and the plate 34.

A tube or sleeve 35 is attached to the lower end of each of the lower portions 25 intermediate the members 31 and such tube is of a size to accommodate a prong 36 carried by implement 37. Each of the tubes 35 is provided with a lock pin 38 receivable within a notch or opening in the prong 36 to lock the prong and tube in assembled relation. If desired, the forward ends of the tubes 35 may be cut at an angle as indicated at 39 in FIGS. 4, 6 and 7 for a purpose which will be described later.

Normally the draft arms 13 are disposed on an outwardly diverging angle from the body 11 of the tractor 10 so that the rear ends are spaced further apart than the front ends. When the tractor exerts a forward pull on the draft arms, the rear ends thereof tend to move inwardly until the arms are parallel with the longitudinal axis of the tractor. Since the prongs are permanently fixed to the implement, they cannot move inwardly, however, the prongs tend to bend so that they are in alignment with the draft arms. In order to prevent any undesired inward movement of the lower portions 25, and adjustable spreader bar or turnbuckle 40 is provided having opposite ends connected by pins 41 to lugs 42 carried by each of the lower portions 25. By adjusting the central portion of the spreader bar, the lower portions 25 will be moved toward or away from each other due to the inherent resiliency of the metal of the body 24 and will be retained in such position regardless of the amount of pull exerted by the tractor. Also in certain circumstances, when the prongs 36 have been previously bent inwardly, the spreader bar 40 can be adjusted so that the tubes 35 will accommodate the prongs regardless of the distortion.

When a tractor having a three-point hitch as illustrated is adapted to accommodate Category I implements, the pin 33 will be approximately ⅞″ in diameter and the opening through the ball type socket 19 will be of a size to slidably receive such pin (FIG. 5). When the opening through the ball type socket 19 is of a size to accommodate the pins of a Category II implement, which are approximately 1⅛″ in diameter, a sleeve 43 is provided which is slidably received within the ball type socket 19 and the pin 33 is received within such sleeve (FIG. 6).

In the operation of the device, the draft arms 13 are connected to the body 24 by the connecting pins 33 after which the draft arms are raised until the tubes 35 are at a desired elevation above the ground. The body is held in a generally vertical position until the link 20 is adjusted to the desired length and connected to the lugs 28 by the pin 30. Thereafter, the vehicle is backed up until the prongs 36 on the implement enter the tubes 35 and are locked therein by the lock pins 38 (FIG. 7). The lift arms 16 again are operated to raise the draft arms 13, body 24 and implement 37. During the initial raising operation the forward ends of the tubes 35 will move toward the draft arms 13 since the draft arms are being pivoted about the pins 14 while the body 24 is being raised generally vertically (FIG. 8). Thereafter, due to the fact that the adjustable link 20 is shorter than the draft arms 13, the apex 27 and upper portion of the body 24 will move through a shorter arc than the lower portions 25 and will swing the body 24 about the pins 33 to move the forward ends of the tubes 35 away from the draft arms.

Although the present invention has been illustrated and described as a device to convert a vehicle three-point hitch for use with an implement having a two-point connection, it is contemplated that it could be used to convert a vehicle two-point hitch for use with an implement having a three-point connection by a simple reversal of parts. In this case tongues carried by the lower portions 25 would be received within tubes carried by the draft arms, a ball type socket would be mounted on each of the lower portions 25, and the lugs 28 would be reevrsed to extend rearwardly to accommodate the third point of the three-point connection.

It will be obvious to one skilled in the art that various changes may be made in the invention without departing from the spirit and scope thereof and therefore the invention is not limited by that which is illustrated in the drawings and described in the specification, but only as indicated in the accompanying claim.

What is claimed is:

1. A tractor hitch converter for connecting an implement having a pair of spaced prongs forming a two-point hitch to a propelling vehicle having a pair of draft arms and an adjustable link forming a three-point hitch, said converter comprising a body having an inverted generally V-shaped upper portion and a pair of spaced generally parallel lower portions, said upper portion terminating in a fixed apex at the upper end, forwardly extending lug means connected to said apex and disposed generally normal to the plane of said upper portion, means on said lug means for vertically adjustably connecting the link of the three-point hitch thereto, each of said parallel lower portions including a pair of spaced generally parallel plates each of which is connected to said upper portion, means on each of said parallel plates for vertically adjustably connecting the draft arms of the hitch thereto, said draft arm attaching means being generally in vertical and transverse alignment with each other but out of vertical and transverse alignment with said link attaching lug means, a prong receiving sleeve mounted between each pair of plates and below said draft arm connecting means and extending forwardly thereof and substantially at right angles to said lower portions, means carried by each of said sleeves for securing the prongs of the implement therein, and an adjustable spreader bar connecting said general parallel lower portions for moving said portions toward and from each other to accommodate prongs of varying spacings, whereby said converter can be mounted on the three-point hitch of the vehicle and said adjustable spreader bar can be operated to align said sleeves with the prongs of an implement to a propelling vehicle, and when said draft arms are raised the adjustable link of the vehicle will pivot said body and the implement about said draft arm connecting means and raise said implement out of engagement with the earth.

References Cited

UNITED STATES PATENTS

| | | | |
|---|---|---|---|
| 2,341,807 | 2/1944 | Olmstead. | |
| 2,786,589 | 3/1957 | Garrett | 172—443 X |
| 2,952,323 | 9/1960 | Orelind et al. | 172—248 |
| 3,312,478 | 4/1967 | Knaapi | 280—415 X |

FOREIGN PATENTS

| | | |
|---|---|---|
| 1,107,986 | 5/1961 | Germany. |
| 1,172,464 | 6/1964 | Germany. |

LEO FRIAGLIA, *Primary Examiner.*